United States Patent
Kurz

(10) Patent No.: US 9,051,125 B2
(45) Date of Patent: Jun. 9, 2015

(54) CONVEYING UNIT FOR THERMOFORM PACKAGING MACHINE

(71) Applicant: Multivac Sepp Haggenmüller GmbH & Co. KG, Wolfertschwenden (DE)

(72) Inventor: Gunnar Kurz, Memmingen (DE)

(73) Assignee: MULTIVAC SEPP HAGGENMUELLER GMBH & CO. KG, Wolfertschwenden (DE)

( * ) Notice: Subject to any disclaimer, the term of this patent is extended or adjusted under 35 U.S.C. 154(b) by 0 days.

(21) Appl. No.: 14/101,140

(22) Filed: Dec. 9, 2013

(65) Prior Publication Data

US 2014/0158502 A1   Jun. 12, 2014

(30) Foreign Application Priority Data

Dec. 10, 2012  (EP) .................................... 12008234

(51) Int. Cl.
| | |
|---|---|
| *B65G 17/06* | (2006.01) |
| *B65G 15/48* | (2006.01) |
| *B65B 41/14* | (2006.01) |
| *B65H 20/16* | (2006.01) |
| *B65G 17/32* | (2006.01) |
| *B65B 9/04* | (2006.01) |

(52) U.S. Cl.
CPC ................ *B65G 15/48* (2013.01); *B65B 41/14* (2013.01); *B65H 20/16* (2013.01); *B65G 17/326* (2013.01); *B65B 9/04* (2013.01); *B65H 2405/552* (2013.01); *B65H 2701/1315* (2013.01)

(58) Field of Classification Search
CPC ........ B65B 9/042; B65B 31/021; B65B 41/14
USPC ...................... 198/626.1, 850, 851, 852, 853; 226/170, 172, 173
See application file for complete search history.

(56) References Cited

U.S. PATENT DOCUMENTS

| | | | | |
|---|---|---|---|---|
| 3,773,235 | A | | 11/1973 | Canamero et al. |
| 4,601,421 | A | * | 7/1986 | Natterer et al. ................ 226/173 |
| 4,826,065 | A | * | 5/1989 | Natterer et al. ................ 226/173 |
| 4,915,283 | A | | 4/1990 | Buchko et al. |
| 5,702,044 | A | * | 12/1997 | Christmann et al. .......... 226/173 |
| 2010/0287889 | A1 | | 11/2010 | Bonneville |
| 2013/0277183 | A1 | * | 10/2013 | Studer ........................... 198/850 |

FOREIGN PATENT DOCUMENTS

| | | |
|---|---|---|
| DE | 3001742 A1 | 7/1981 |
| DE | 3315419 A1 | 10/1984 |
| DE | 3716673 A1 | 11/1987 |
| DE | 10351125 A1 | 6/2005 |
| DE | 102005038356 A1 | 2/2007 |
| EP | 0302534 A2 | 2/1989 |
| EP | 1977983 A1 | 10/2008 |

* cited by examiner

*Primary Examiner* — James R Bidwell
(74) *Attorney, Agent, or Firm* — Husch Blackwell LLP

(57) ABSTRACT

The invention relates to a conveying unit for guiding and conveying a material web in a thermoform packaging machine, comprising, on either longitudinal side of a machine frame, a conveyor chain, a chain wheel and a guide device. A chain link of the conveyor chain and a clamp guide can be implemented together and in one piece as a shaped part.

8 Claims, 6 Drawing Sheets

CONVEYING UNIT FOR THERMOFORM PACKAGING MACHINE

CROSS-REFERENCE TO RELATED APPLICATIONS

This Application claims priority to European Application Number 12008234.2 filed Dec. 10, 2012, to Gunnar Kurz entitled "Conveying Unit for Thermoform Packaging Machine," currently pending, the entire disclosure of which is incorporated herein by reference.

FIELD OF THE INVENTION

The invention relates to a conveying unit for a thermoform packaging machine.

BACKGROUND OF THE INVENTION

DE 33 15 419 A1 discloses a conveying unit in a thermoform packaging machine, which is also referred to as clamp chain and which is used for guiding and conveying a material web. The clamp chain comprises a link chain with chain links and a plurality of clamping jaws, fixed clamping jaws being connected by means of a riveted joint with a bolt to a respective chain link. The movable clamping jaw has a bore accommodated in a flange sleeve provided on the fixed clamping jaw, so that the movable clamping jaw can be held and also moved relative to the fixed clamping jaw. A compression spring arranged between the fixed and the movable clamping jaw provides a biasing force in the direction of the closed position at which the material web is clamped between the movable and the fixed clamping jaw.

The known clamp chain has, on the one hand, the drawback that the fixed clamping jaws must be connected to the chain links and that this requires a considerable mounting effort. On the other hand, a few gaps exist between the chain link and the fixed clamping jaw as well as between the chain links themselves, said gaps being difficult to clean and therefore disadvantageous for hygienic reasons.

DE 103 51 125 A1 discloses a force-transmitting hybrid chain for a completely different technical field, i.e., for the field of internal combustion engines.

SUMMARY OF THE INVENTION

It is the object of the present invention to provide an improved conveying unit for a thermoform packaging machine.

The conveying unit according to one embodiment the present invention used for guiding a material web in a thermoform packaging machine and comprising, on either longitudinal side of a machine frame, conveyor chains, chain wheels and guide devices oriented in a direction of production is characterized in that a chain link of the conveyor chain and a clamp guide are implemented together and in one piece as a shaped part (or molded part). Gaps which are difficult to clean can thus be avoided or the number of gaps can at least be reduced. Another advantage accomplished is that the number of components to be mounted is reduced.

The shaped part may have on its upper and on its lower side at least one guide element, which is adapted to be accommodated in the guide devices so as to take up transverse forces generated due to the fact that the material web is laterally held under tension.

According to one embodiment, the shaped part is configured as an investment casting or a sintered part or an injection molded part. When such materials are used, bearing seats and guide surfaces can be produced without subsequent machining Also materials with sliding properties are imaginable.

The guide devices can be provided at least for an upper run of the conveyor chains so as to take up forces transversely to the direction of production, since the upper run of the conveyor chain holds the material web, whereas the lower run represents the return run of the circulating conveyor chains.

According to one embodiment, the shaped part has, when seen in the direction of production, a first and a second link contour on a first side thereof and a third link contour on an opposite second side thereof, the third link contour of a shaped part being, for the purpose of assembly of two shaped parts, provided between the first and second link contours of a further shaped part.

The shaped part can have two holes which are arranged coaxially with one another and used for accommodating a bolt, and a further hole for accommodating a further bolt, so that shaped parts can be articulated on one another thus forming a chain.

According to one embodiment, the link contours each have a projection, which is provided for engagement with the chain wheel, so that the conveyor chain can be moved intermittently in the direction of production.

A clamp member, which may be provided for holding the material web together with the clamp guide, can be configured such that it is movable relative to the clamp guide, so that the material web can easily be released and clamped.

A compression spring may be provided between the clamp member and the clamp guide and can be configured for applying the clamping force required for holding the material web.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views.

Identical components are designated by identical reference numerals throughout the figures.

DETAILED DESCRIPTION OF THE INVENTION

Figure 1:
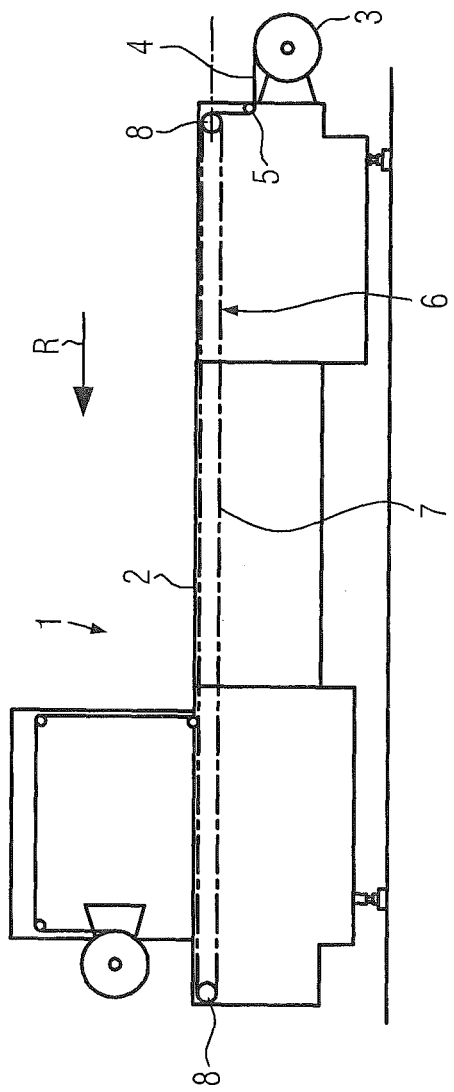
FIG. 1 is a schematic side view of a thermoform packaging machine with a conveying unit in accordance with one embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows a thermoform packaging machine 1 comprising a machine frame 2 and, on the input side thereof, a roll 3. A material web 4, for example a film web, is unwound from the roll 3 and guided via a roll 5 to a conveying unit 6 according to the present invention. The conveying unit 6 may have a conveyor chain 7 on either side of the material web 4 along a direction of production R, said conveyor chains 7 being deflected and partly driven via chain wheels 8 at their points of deflection at both ends of the machine frame 2. The conveyor chains 7, which are not shown in detail in FIG. 1, can include clamps by means of which the material web 4 is laterally gripped and guided in the direction of production R through the processing stations, which are not shown in detail, such as the forming station, the sealing station and the cutting station of the thermoform packaging machine 1. At the output side of the thermoform packaging machine 1, the material web 4 is released from the clamps.

Figure 2:
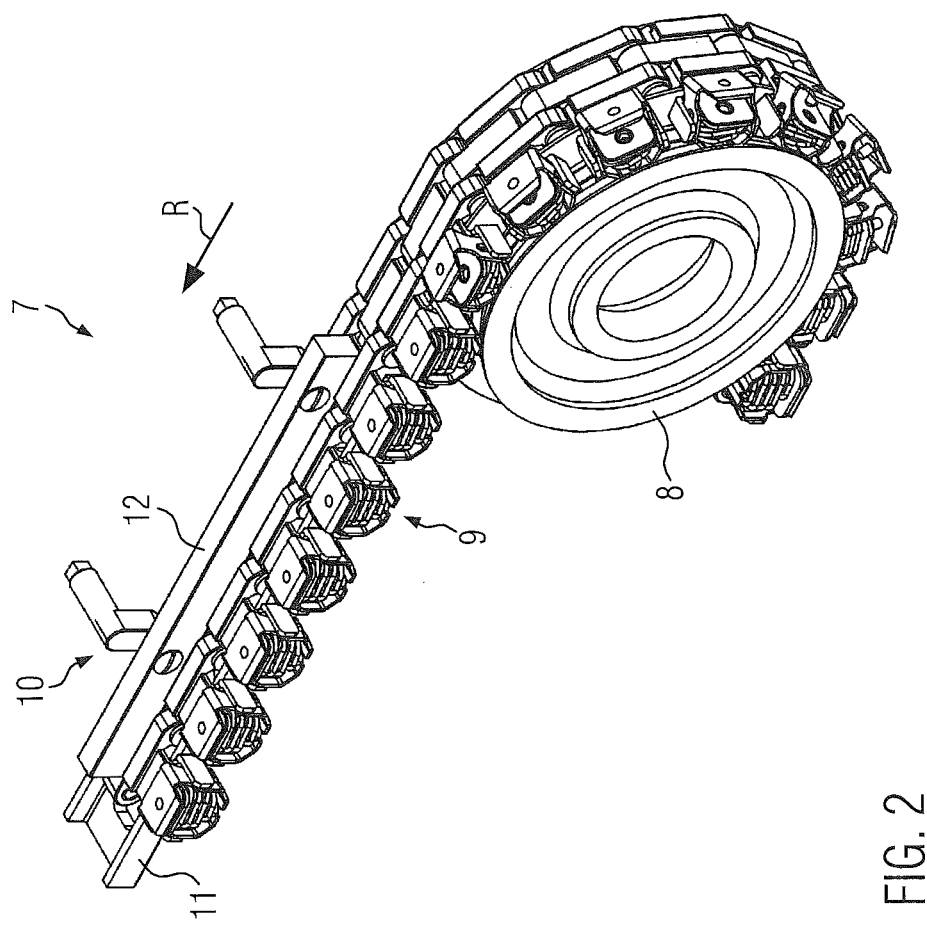
FIG. 2 is a partial top perspective view of a conveying unit in accordance with one embodiment of the present invention.
Figure 3:
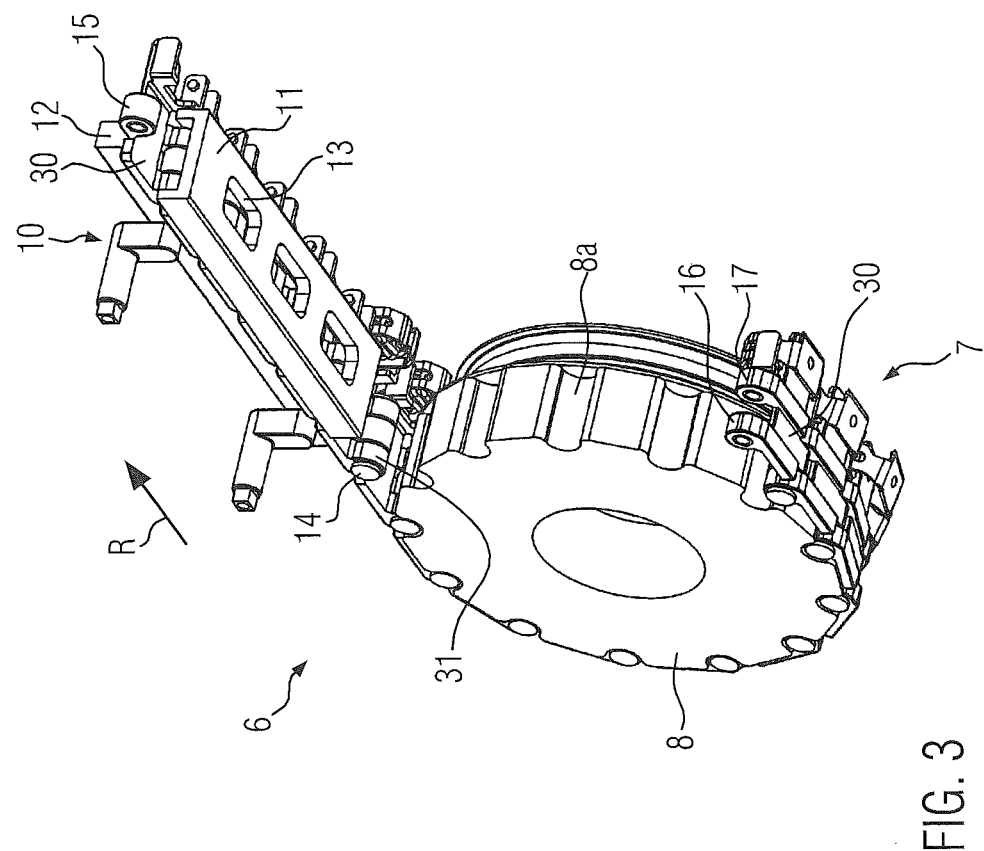
FIG. 3 is a partial bottom perspective view of a conveying unit in accordance with one embodiment of the present invention.

FIG. 2 and FIG. 3 show the conveyor chain 7, which is deflected and driven via the chain wheel 8. The upper run 9 of the conveyor chain 7 can be guided between an upper guide device 10 and a lower guide device 11, so as to take up the forces occurring transversely to the direction of production R so that the material web 4 can also be held under lateral tension when it is being conveyed. The forces occurring may be caused by shrinking of the material web 4, for example, due to heat input in the forming or in the sealing station, or by conically diverging guide devices 10, 11. The guide devices 10, 11 can be secured to the machine frame 2. Since the upper guide device 10 only comprises one guide rail 12 in the embodiment shown, and since the lower guide device 11 may be provided with openings 13, as shown in FIG. 3, the conveying unit 6 is easy to clean. The guide devices 10, 11 consist of, for example, a plastic material with good sliding properties and they may be fiber-reinforced. Bolts 14, by means of which the chain links or shaped parts 30 of the conveyor chain 7 are interconnected, can cooperate as a lateral guide abutment with the lower guide device 11. If the bolts 14 are countersunk in the shaped part 30, so that their ends do not project beyond the shaped part 30, the surfaces of the shaped part 30, which are in contact with the lower guide device 11, serve as abutment faces with respect to the lower guide device 11.

Link contours 15, 16, 17 of the shaped part 30 each have a shape or projection 31 suitable for engagement with the chain wheel 8 and are implemented such that the driving torque can be transmitted from a motor, which is not shown, to the conveyor chain 7. In particular, the outer side of the link contours 15, 16, 17, which is, for example, cylindrically curved, can serve as a projection 31 whose contour is adapted to a recess 8a of the chain wheel 8. When the conveyor chain 7 is in operation, the projection 31 can engage with the recess 8a of the chain wheel 8. In the embodiment shown, each of the three link contours 15, 16, 17 of the shaped part 30 has provided thereon an adequate projection 31 for engagement with the chain wheel 8. It would, however, suffice, if at least one link contour or two axially aligned link contours 16, 17 of the shaped part 30, had a projection 31 for engagement with the chain wheel 8.

Figure 4:
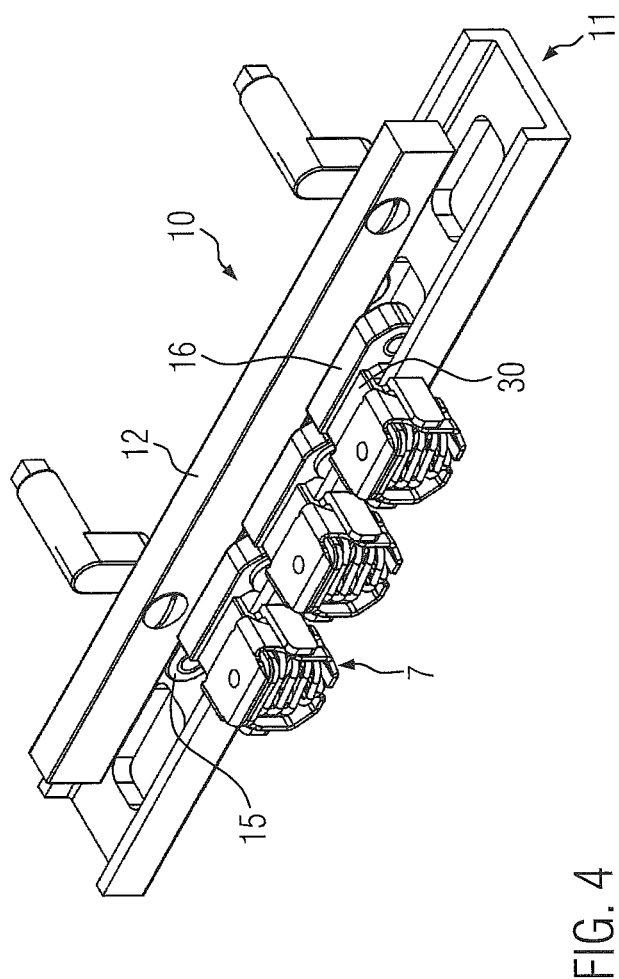
FIG. 4 is a partial top perspective view of a conveying unit in accordance with one embodiment of the present invention.

FIG. 4 shows how a shaped part 30 is guided in the upper guide device 10 by two elevated portions of a second link contour 16 and a third link contour 17 by means of the guide rail 12. In addition to the upper guide device 10, the shaped part 30 can be guided in the lower guide device 11 by means of the respective outer side of the second 16 and third (concealed by the guide rail 12) link contour 17. The individual shaped parts 30 and, consequently, the conveyor chain 7 can thus be guided such that they are secured against rotation and tilting.

Figure 5B:
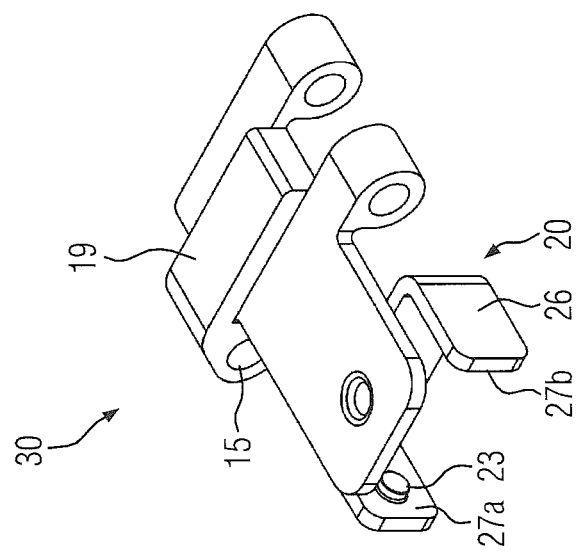
FIG. 5b is an enlarged perspective view of a variant of a shaped part of a of a conveying unit in accordance with one embodiment of the present invention.
Figure 5A:
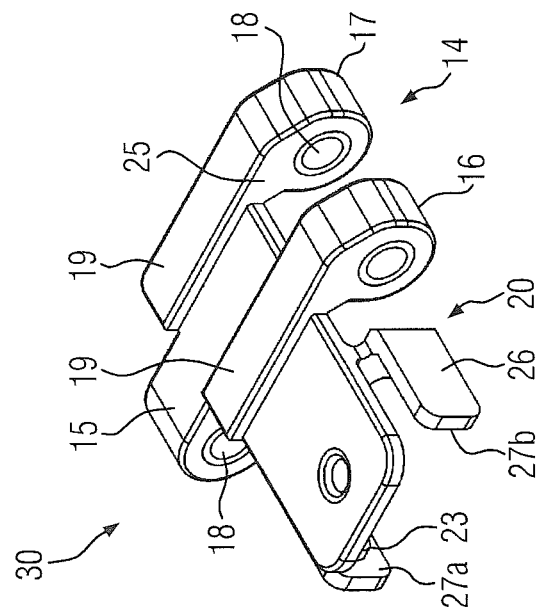
FIG. 5a is an enlarged perspective view of a shaped part of a of a conveying unit in accordance with one embodiment of the present invention.

FIG. 5a shows a shaped part 30 as an individual component having the structural design described above. A chain link 14 and a clamp guide 20 are shown, which may be implemented in common as a single, one-piece shaped part 30. The shaped part 30 can have a first link contour 15 on the left side and a second 16 and third link contour 17 on the right side of the representation with respective concentrically arranged holes 18 configured for connection with a further shaped part 30 by means of a bolt. The distance within the second 16 and the third link contour 17 may correspond to the width of the first link contour 15 arranged on the left/right side of the shaped part 30. The first link contour 15 can also be provided with a hole 18 for bolt connection with the second 16 and third link contour 17 of a neighboring shaped part 30. The hole 18 may also be configured for accommodating plain bearings.

The shaped part 30, which may, for example, consist of metal, can comprise two guide elements 19 on its upper side, which are integrated in the projection of the second 16 and third link contour 17. The inner side faces 25 may define contact surfaces with respect to the guide rail 12.

FIG. 5b shows a further embodiment of the shaped part 30, which differs from the shaped part 30 according to FIG. 5a insofar as the first link contour 15 has a guide element 19 on the upper side thereof. The upper guide device 10 could here comprise two guide rails 12 instead of one, so as to guide the guide element 19 between these guide rails 12.

Figure 6:
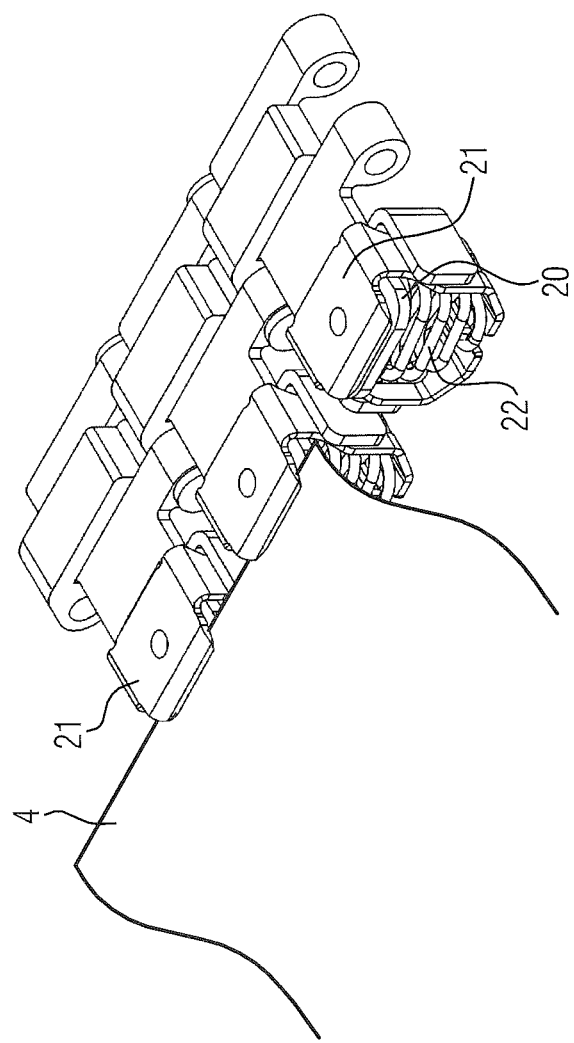
FIG. 6 is an enlarged perspective view of plurality of shaped parts as an assembly group with guide devices in accordance with one embodiment of the present invention.

The clamp guide 20, which can be oriented towards the viewer in the representations according to FIGS. 5a and 5b, may comprise a bracket 26 provided for accommodating and guiding a clamp member 21 (cf. FIG. 6). The bracket 26 may be provided with a bolt-like elevation 23 on both inner guide surfaces 27a,b for the clamp member 21, said bolt-like elevations 23 cooperating with recesses of the clamp member 21, which are not shown in detail, so as to accomplish the guide function.

For gripping the material web 4, the material web 4 may be, as shown in FIG. 6, pressed against the upper support surface of the clamp guide 20 by the clamp member 21. This clamping force can be produced by a compression spring 22, which presses a lower flange or bracket of the clamp member 21 downwards and, in so doing, rests on the lower side of the support surface of the clamp guide 20. The bracket 26 may be provided with a bolt-like elevation 23 on both guide surfaces 27a,b for the clamp member 21, said bolt-like elevations 23 cooperating with recesses of the clamp member 21, which are not shown, so as to accomplish the guide function.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The tens "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A conveying unit for guiding a material web in a thermoform packaging machine, said conveying unit comprising:
    on each longitudinal side of a machine frame, a conveyor chain, a chain wheel and a guide device oriented in a direction of production;
    wherein a chain link of the conveyor chain and a clamp guide are implemented together and in one piece as a shaped part, and
    wherein, when seen in the direction of production, the shaped part has a first link contour on a first side thereof, and second and third link contours on an opposite second side thereof, the first link contour of a shaped part being located between the second and third link contours of a neighboring shaped part, when two shaped parts have been assembled.

2. The conveying unit according to claim 1, wherein the shaped part has on its upper and lower sides at least one guide element adapted to be accommodated in the guide device.

3. The conveying unit according to claim 1, wherein the shaped part is configured as at least one of an investment casting, a sintered part and an injection molded part.

4. The conveying unit according to claim 1, wherein the guide device is provided at least for an upper run of the conveyor chain so as to take up forces transversely to the direction of production.

5. The conveying unit according to claim 1, wherein the shaped part includes two holes arranged coaxially with one another and used for accommodating a bolt, and a further hole for accommodating a further bolt.

6. The conveying unit according to claim 1, wherein at least one of the link contours has a projection provided for engagement with the chain wheel.

7. The conveying unit according to claim 1, wherein a clamp member, which is provided for holding the material web together with the clamp guide, is configured such that it is movable relative to the clamp guide.

8. The conveying unit according to claim 7, wherein a compression spring is provided between the clamp member and the clamp guide so as to apply the clamping force required for holding the material web.

* * * * *